June 30, 1964     C. H. PARSONS     3,139,616
CHANGEABLE COLOR ILLUMINATED INDICATING DEVICE
Filed Nov. 1, 1960
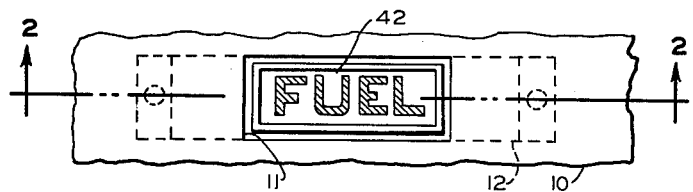
FIG. 1.
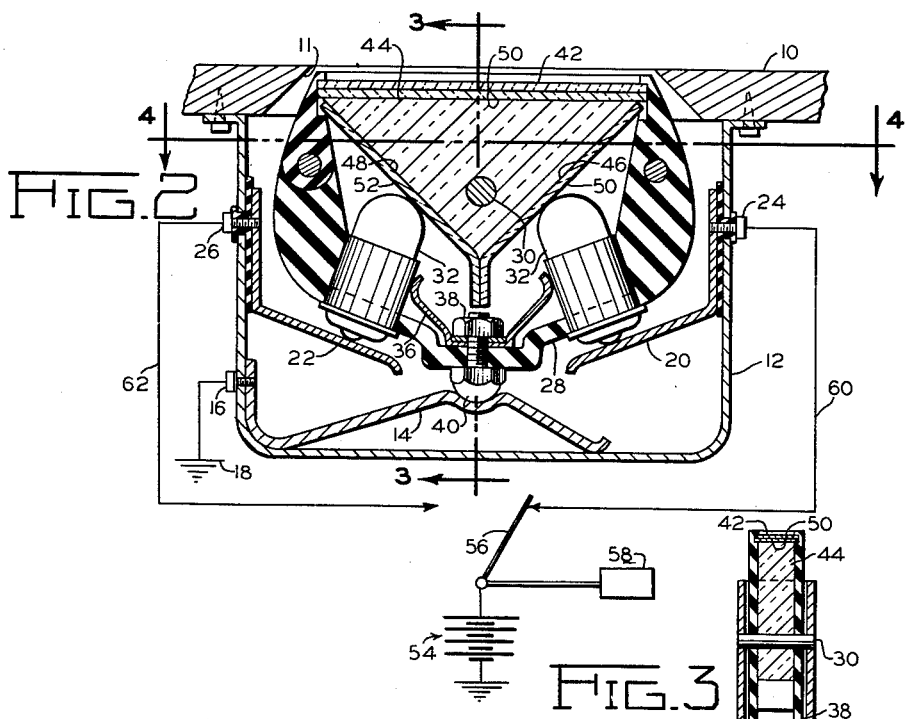
FIG. 2.
FIG. 3.
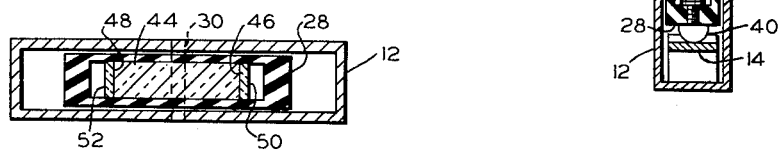
FIG. 4.
INVENTOR.
Curtis H. Parsons
BY
Owen & Owen
ATTORNEYS United States Patent Office 3,139,616
Patented June 30, 1964

3,139,616
CHANGEABLE COLOR ILLUMINATED
INDICATING DEVICE
Curtis H. Parsons, Redondo Beach, Calif., assignor to
Don M. Hallerberg, Los Angeles, Calif.
Filed Nov. 1, 1960, Ser. No. 66,495
1 Claim. (Cl. 340—378)

This invention relates to an indicating or warning signal device of the type used to monitor various operating conditions in aircraft, automotive vehicles and the like. More particularly, the invention relates to a signalling device adapted for installation on an instrument board or panel in which an indicia-bearing, translucent screen printed with information which is desired to display, either in figures, letters or symbols may be selectively illuminated in one of two or more colors depending upon the occurrence or existence of a predetermined condition.

The primary object of the invention is the provision of an improved indicating or monitoring light assembly which may be quickly and easily installed and connected, and that operates efficiently and automatically.

A further object of the invention is the provision of a small but rugged indicating signal device which is composed of a relatively few parts which are subject to failure and which provides a readily distinguishable signal upon a change in an operating condition of equipment monitored thereby.

Other objects and advantages of the invention will in part be apparent and will in part appear hereinafter. For a better understanding of the nature and objects of the invention reference should be had to the following detailed description and accompanying drawings, in which:

FIG. 1 is a fragmentary front view of the indicia-bearing translucent screen and housing assembly which may be used in a device embodying the present invention;

FIG. 2 is a sectional view of the warning light means embodying the present invention taken along the line 2—2 of FIG. 1 and shown in connection with an operating circuit;

FIG. 3 is a sectional view taken along the line 3—3 of FIG. 2; and

FIG. 4 is a sectional view taken along the line 4—4 of FIG. 2.

Briefly, the present invention, according to a preferred embodiment thereof, comprises a combination of elements including a polygonal, hollow lamp carrying capsule, one face of which constitutes a translucent indicia-bearing face, at least two indicating lamps having their bulb portions extending into the capsule from spaced faces thereof, a prism mounted in the capsule and having a light transmitting plane side thereof extending along and adjacent the translucent indicia-bearing face and additionally having a light receiving plane side adjacent each of the lamps, and a plurality of different colored translucent screens, one of which extends between each indicating lamp bulb portion and its adjacent light receiving prism side. The electric circuit for the device includes a source of power for the indicating lamps, switch means connecting the source of power to any one of the lamps, and means for actuating the switch means to selectively establish contact with and thereby energize a certain one of the lamps upon the existence of a predetermined condition. While the device according to the invention will hereinafter be described as employing two warning lamps and two colored screens operatively associated therewith, it will be obvious that more than two such lamps and associated colored screens may be utilized if desired, the number employed being chiefly determined by the number of variations in conditions that it is desired to monitor. In this respect, the specific disclosure is for purposes of illustration only, and is not to be considered limitative.

Referring now more particularly to the drawings, the present invention is shown embodied in a unit mounted for cooperation with a panel 10 having an opening 11 therein. For purposes of illustration, the device in accordance with the invention is shown in association with a housing and light capsule as disclosed in U.S. Patent 2,769,974 to Marvin F. Hayes. This patent relates to a lamp container for an illuminatable warning device which has been found to be highly desirable because of the ease of "re-bulbing" the device due to the provision of a rotatably mounted lamp-carrying block or capsule.. Although such lamp container is particularly well adapted for use with the device embodying the present invention, it will be apparent that any other suitable stationary mounting may be employed if desired, the inventive features of the above-identified patent forming no part of the instant invention. In this respect then, the structure of the container which is substantially identical with the structure disclosed in the Hayes patent will be described only to the extent necessary for an understanding of the present invention.

A housing 12 is firmly fastened to the rear of the panel 10, and may be formed of insulating material or of metal if the proper precautions are taken to insulate all current carrying contacts in a manner well known in the art. The housing is a hollow body with one side open and has a spring contact 14 at the base thereof to which an external contact screw 16 is connected, which screw is in turn suitably grounded, as indicated at 18. On opposite sides of the interior of the housing are additional spring contacts 20 and 22 each having a base portion fixed to the interior of the housing and receiving a contact screw 24 and 26 respectively.

A hollow lamp-carrying capsule 28 is mounted for rotation in the housing 12 on a central pin or pivot member 30. The lamp carrying capsule is preferably made of insulating material. In the form shown, the capsule 28 is hexagonal and is bored to receive a pair of spaced lamps 32 and 34 in spaced sides of the hexagon. Each lamp is of a size as to be capable of insertion through the hole in the capsule from the outside, with the bulb portion thereof lying within the capsule.

At the base of the capsule 28 a dual contact 36 is provided and fixed in place by a suitable fastening 38 which extends outwardly from the capsule into a detent and contact button 40. In the normal position of its operation, the contact button 40 is received in a depression in the contact spring 14 which extends across the base of the housing. The indicating device is thus centered with the capsule 28 symmetrically disposed with respect to the housing and associated contact springs 20 and 22.

The capsule 28 is opened at one side and receives an indicia-bearing screen or translucent lens 42 across the opening. The screen is printed with the proper information which it is desired to display either in letters, figures, or symbols, and in the embodiment illustrated, is printed with the word "FUEL." It will thus be seen that to "rebulb" the device, it is only necessary for the operator to rotate the capsule to a position where the side of the capsule carrying the burned out bulb is exposed through the opening in the panel. For more detail in this respect, reference should be had to the aforementioned Hayes patent.

In accordance with the instant invention, a prism 44 is located immediately behind the indicia-bearing screen 42 and cemented or otherwise fixed to the top and bottom portions of the capsule 28. In the embodiment illustrated, the prism is substantially triangular in shape and has light receiving plane sides 46 and 48 adjacent each of the bulb portions of the lamps, and a light transmitting plane side 50 adjacent the indicia-bearing screen. In this respect, the prism employed must be selected, in a manner well known in the art, to have the proper refractive index and angles between its sides so as to be effective to bend at least a portion of the light incident on the light receiving faces thereof outwardly through the face adjacent the indicia-bearing screen.

Fixed against each of light receiving plane sides 46 and 48 of the prism 44 is a colored translucent screen 50 and 52 respectively. The screens may consist of an elongated gelatinous strip or the like, the coloring of the gelatin of one of the strips being different from the coloring thereof in the other. Each strip or screen preferably extends beyond the end of the prism to partition off the respective lamps as shown in FIG. 2. In this manner then it will be seen that the indicia-bearing screen or lens 42 will be illuminated in one color or another in accordance with which one of the lamps 32 or 34 is energized, and shadows from one side or the other will be effectively prevented.

The circuit illustrated in connection with the warning device consists of a power source, such as the battery indicated generally at 54 and a double throw switch such as indicated at 56. Any suitable means for actuating the switch is shown schematically at 58, which, in the case of monitoring the fuel supply, may merely consist of a means responsive to the level of a float or the like. One contact of the switch 56 is connected to the spring contact 20 through a conductor 60. In this manner, when the switch 58 is in the position shown, a circuit from the power source 54 to the bulb 32 is established through the bulb base contact 20 and returning from the bulb 32 through the dual contact 36, through the contact button 40, and through the spring contact 14 to ground.

In a similar manner, the other contact of the switch 58 is connected to the base contact 22 of the opposite bulb 34 through a conductor 62 whereby, upon the switch 58 being thrown to the left, a circuit from the power source 54 to the bulb 34 is established, current flowing from the bulb 34 through the dual contact 36, through the contact button 40, and through the spring contact 14 to ground.

It will now be readily apparent that a relatively simple yet highly effective indicating device is provided by the present invention. For example, if the device is to be used in connection with the fuel supply of an aircraft, automobile, or the like, a strip of gelatinous light-filtering material (for example, green colored), is located as shown at 50 and a strip of a different colored gelatinous material (for example, red colored) is located as shown at 52. The actuating means 58 in this instance may be a float valve set in such a manner so as to maintain the switch 56 in contact with the conductor 60 as long as the float remains above a predetermined level. In this respect, the indicia-bearing means 42 would be illuminated in green whereby the operator can tell at a glance that his fuel supply is sufficient at that time.

Upon the occurrence of a certain condition or some abnormality desired to be monitored, for example in the present embodiment, by the fuel level falling below the predetermined level, the float valve actuates the switch 56, throwing the same to the left whereby the circuit from the power source or battery 54 to the lamp 34 is established while the circuit through the lamp 32 is disconnected. The operator is then warned immediately that the fuel supply has reached a low level by reason of the "FUEL" indication being now illuminated in red letters instead of green.

It will now be apparent that a novel and highly effective warning device is provided by the present invention, which device fulfills all of the objects previously set forth, and particularly enables a readily discernible signal to be effected due to the color change of the indicia-bearing screen or lens. Further while the invention has been disclosed in conjunction with a specific form and disposition of the parts, it should be expressly understood that it is capable of numerous modifications and changes without departing from the spirit of the appended claims.

I claim:

A warning signal of the class described comprising, in combination, a polygonal hollow housing comprising a lamp carrying capsule, one face of said capsule constituting a translucent indicia-bearing face, a plurality of indicating lamps mounted in said housing having their bulb portions extending into said capsule, a colorless transparent triangular prism mounted in said capsule and having one plane light transmitting side thereof extending along and adjacent said translucent indicia-bearing face and additionally having each of two other plane light-receiving sides adjacent each of said lamps, different colored translucent screens, each adjacent a respective one of said two other light-receiving sides, each color translucent screen extending along said two other light receiving sides between each indicating lamp bulb portion and its adjacent light-receiving prism side, a source of power for said indicating lamps, switch means connecting said source of power to any one of said lamps, and means for actuating said switch to selectively establish contact with and thereby energize a selected one of said lamps upon the existence of a predetermined condition whereby said indicia-bearing face is illuminated in the color of the translucent screen adjacent the energized lamp.

References Cited in the file of this patent

UNITED STATES PATENTS

| | | |
|---|---|---|
| 2,140,229 | Hipsley | Dec. 13, 1938 |
| 2,374,408 | Braidwood | Apr. 24, 1945 |
| 2,740,957 | Davies | Apr. 3, 1956 |
| 2,925,592 | Noyes | Feb. 16, 1960 |